(12) United States Patent
Tomoguchi et al.

(10) Patent No.: US 7,235,181 B2
(45) Date of Patent: Jun. 26, 2007

(54) METAL POWDER FOR DECOMPOSITION OF ORGANIC HALOGEN AND METHOD FOR MANUFACTURING THE SAME

(75) Inventors: Masaru Tomoguchi, Tokyo (JP); Taishi Uehara, Tokyo (JP)

(73) Assignee: Dowa Mining Co., Ltd., Tokyo (JP)

( * ) Notice: Subject to any disclaimer, the term of this patent is extended or adjusted under 35 U.S.C. 154(b) by 416 days.

(21) Appl. No.: 10/451,067

(22) PCT Filed: Sep. 10, 2002

(86) PCT No.: PCT/JP02/09193

§ 371 (c)(1),
(2), (4) Date: Sep. 16, 2003

(87) PCT Pub. No.: WO03/022468

PCT Pub. Date: Mar. 20, 2003

(65) Prior Publication Data

US 2004/0045403 A1    Mar. 11, 2004

(30) Foreign Application Priority Data

Sep. 10, 2001    (JP) .............................. 2001-273561

(51) Int. Cl.
    *C02F 1/70* (2006.01)
(52) U.S. Cl. ...................... 210/757; 210/908; 210/909; 405/128.75; 405/129.25
(58) Field of Classification Search ................. 210/757
    See application file for complete search history.

(56) References Cited

U.S. PATENT DOCUMENTS 4,382,865 A * 5/1983 Sweeny ...................... 210/743
5,362,402 A * 11/1994 Haitko et al. ................ 210/757
5,759,389 A * 6/1998 Fernando et al. ......... 210/198.1
5,855,797 A * 1/1999 Luong et al. ............. 405/128.5
6,217,779 B1 * 4/2001 Orth et al. ................... 210/757
6,287,472 B1 * 9/2001 Gillham et al. ............. 210/747
6,303,367 B1   10/2001 Kataoka et al. ........... 435/262.5
6,828,141 B2 * 12/2004 Kataoka et al. ........... 435/262.5
7,138,059 B2 * 11/2006 Sorenson et al. ........... 210/610

FOREIGN PATENT DOCUMENTS

| EP | 361581 A1 * | 4/1990 |
| JP | A 2002-317202 | 10/2002 |
| WO | WO 98/34740 | 8/1998 |

* cited by examiner

*Primary Examiner*—Peter A. Hruskoci
(74) *Attorney, Agent, or Firm*—Oliff & Berridge, PLC

(57) ABSTRACT

The present invention is to provide metal powder capable of decomposing and remedying various range of organic halogen compounds including organic halogen compounds which are difficult to be decomposed by a conventional decomposition and remediation method. Metal powder for decomposition of organic halogen is prepared in such a manner that the metal powder contains at least two kinds or more of metal elements, the respective metal elements forming phases, the respective metal elements therein serving as major constituents thereof, wherein difference in standard oxidation-reduction electric potential between any two kinds among the above-described metal elements is 778 mV or more in absolute value. When remediation treatment of soil is carried out using the metal powder, it is sufficient that the metal powder for decomposition of organic halogen is mixed with agitation into soil using, for instance, a heavy machine, and when remediation treatment of ground water, it is sufficient that a reaction wall containing the metal powder for decomposition of organic halogen into is constructed in the ground.

3 Claims, 4 Drawing Sheets

Fig.4

| ORGANIC CHLORINATED COMPOUND | cis-1,2-DCE | MCB | 1,2-DCB | 1,3-DCB | DCM |
|---|---|---|---|---|---|
| HALF-LIFE | IRON POWDER | SCARCELY DECOMPOSED | SCARCELY DECOMPOSED | SCARCELY DECOMPOSED | SCARCELY DECOMPOSED | SCARCELY DECOMPOSED |
| | COPPER-CONTAINING IRON POWDER | 3.2 | SCARCELY DECOMPOSED | SCARCELY DECOMPOSED | SCARCELY DECOMPOSED | 12.0 |

METAL POWDER FOR DECOMPOSITION OF ORGANIC HALOGEN AND METHOD FOR MANUFACTURING THE SAME

TECHNICAL FIELD

The present invention relates to metal powder for decomposition of organic halogen to decompose organic halogen compounds which contaminate environment such as soil, river water, ground water, atmosphere and gases and so on in high speed.

BACKGROUND ART

In recent years, contamination of soil, ground water, and so on by organic halogen compounds represented by organic halogen compound such as tetrachloroethylene (hereinafter referred to as PCE), trichloroethylene (hereinafter referred to as TCE), dichroloethylene (hereinafter referred to as DCE) and so on have become manifest, which is taken up as a social problem.

Meanwhile, various methods for remedying these organic halogen compounds have been devised.

For instance, a method of an aerobic or anaerobic decomposition process has been described in the Official Gazette of Japanese Patent Laid-open No. Hei 7-178395.

Still further, for instance a method of oxidative decomposition process using a photocatalyst has been described in the Official Gazette of Japanese Patent Laid-open No. Hei 7-144137.

Yet further, for instance, a method of reductive decomposition process by spongy iron powder (hereinafter referred to as iron powder) has been described in the Official Gazette of Japanese Patent Laid-open Hei 11-235577.

In addition to the above, for instance, in the Official Gazette of Japanese Patent Laid-open No. 2000-5740, it has been disclosed that iron powder containing copper (hereinafter referred to as copper-containing iron powder), prepared by metal copper being combined in an amount of 0.2 wt % to 20 wt % on a metal iron powder surface, makes it possible to enhance decomposition activity of metal iron powder for organic halogen compounds In order to remedy contamination of soil, ground water, and so on contaminated by organic halogen compounds, such a technical method described above has been disclosed or proposed. However, since organic halogen compounds are so various, there still exist some organic halogen compounds for which remediation with such a technical method is still difficult.

In other words, there still exist organic halogen compounds to be described later, which are difficult to be decomposed even by using iron powder or copper-containing iron powder which is presently thought to be promising as a decomposition and remediation method for organic halogen compounds.

DISCLOSURE OF THE INVENTION

The present invention has been developed in the above background, and the object of the invention is to provide metal powder capable of decomposing and remedying various range of organic halogen compounds including organic halogen compounds which are difficult to be decomposed by a conventional decomposition and remediation method in high speed.

The present inventors first prepared various iron powder samples, and carried out measurement of decomposition rate of TCE which was selected as a typical organic halogen compound, using the above-described iron powder samples.

The result shows that the above-described iron powder and the copper-containing iron powder have relatively large decomposition rate.

However, the result also shows that it is still difficult even for these iron powder and copper-containing iron powder to decompose and remedy organic halogen compounds such as monochlorobenzen (hereinafter referred to as MCB) and so on which are difficult to decompose and remedy in high speed.

Here, the present inventors conducted structural analysis and electrochemical analysis for particles of the iron powder and the copper-containing iron powder, and after much trial and error based on the results of the above analyses, finally have come up with metal powder capable to decompose and remedy organic halogen compounds difficult to decompose and remedy such as MCB and the like in high speed and have completed the present invention.

That is, a first invention is to provide metal powder for decomposition of organic halogen comprising at least two kinds or more of metal elements, the respective metal elements forming phases, the respective metal elements therein serving as major constituents thereof, and the metal powder containing the phases, wherein difference in standard oxidation-reduction electric potential between any two kinds among the above-described metal elements is 778 mV or more in absolute value.

The metal powder of this constitution for decomposition of organic halogen has capability to decompose and remedy hardly decomposable organic halogen compounds for which an iron powder or a copper-containing iron powder having 777 mV or less of the difference in standard oxidation-reduction electrical potential in absolute value is difficult to decompose.

As a result, the metal powder of this constitution for decomposition of organic halogen compounds exhibits a great effect on remediation of soil, ground water, or the like contaminated by the hardly decomposable organic halogen compounds.

A second invention is to provide the metal powder for decomposition of organic halogen described in the first invention, wherein at least two kinds of phases among the aforementioned phases expose themselves on the surface of the metal powder.

The above-described metal powder of this constitution for decomposition of organic halogen can decompose organic halogen compounds around the metal powder effectively.

As a result, the metal powder of this constitution for decomposition of organic halogen realizes the reduction of the decomposition and remediation time, reduction of the usage of the metal powder, and so on when remedying soil, ground water, or the like contaminated by the above-described hardly decomposable organic halogen compounds so as to exhibit its effect in reduction of operation cost.

A third invention is to provide the metal powder for decomposition of organic halogen described in the first or second invention, wherein the metal powder for decomposition of organic halogen has a structure such that the other phases are combined to the surface of at least one phase among the above-described phases.

The metal powder of this constitution for decomposition of organic halogen can reduce the content ratio of a metal element which is a major constituent of the above-described other phase in the metal powder, while keeping the difference in standard oxidation-reduction electric potential in absolute value between a metal element which is a major constituent of at least the above-described one phase and a metal element which is a major constituent of the other phase.

As a result, the metal powder of this constitution for decomposition of organic halogen can restrain increase of the manufacturing cost of the metal powder without reducing the capability to decompose and remedy the hardly decomposable organic halogen compounds when high cost metal element is used as a major constituent for the above-described other phase.

A fourth invention is to provide the metal powder for decomposition of organic halogen described in any invention from the first invention to the third invention, wherein at least one phase comprises Co or Al as its major constituent.

The metal powder of this constitution for decomposition of organic halogen is stable as a metal powder and easy in handling and storage.

As a result, the metal powder of this constitution for decomposition of organic halogen exhibits its effect on reduction of the operation cost on remediation of soil, ground water or the like contaminated by the hardly decomposable organic halogen compounds.

A fifth invention is to provide the metal powder for decomposition of organic halogen described in any invention from the second invention to the fourth invention, wherein difference in standard oxidation-reduction electric potential between any two kinds of the metal elements which are major constituents of the phases exposing on the surface of the metal powder is 778 mV or more in absolute value.

The metal powder of this constitution for decomposition of organic halogen can reduce the manufacturing cost of the metal powder in addition to that the organic halogen compounds around the metal powder can be decomposed effectively.

As a result, the metal powder of this constitution for decomposition of organic halogen exhibits its effect on reduction of the operation cost on remediation of soil, ground water or the like contaminated by the hardly decomposable organic halogen compounds.

A sixth invention is to provide a method for manufacturing the metal powder for decomposition of organic halogen described in any invention from the first invention to the fifth invention, wherein the method utilizes the difference in ionization tendency between one phase among the above-described phases and other phases so that the other phases are combined to the one phase.

According to this manufacturing method, by controlling the concentration of the combining metal solution, immersion time, and so on, it becomes possible to control a state or thickness when a phase which is described as the other phase and has combining metal as a major constituent combines to a phase which is described as one phase and has base metal as a major constituent.

Therefore, it is a manufacturing method to easily prepare metal powder for decomposition of organic halogen having a uniform characteristic.

A seventh invention is to provide the method for manufacturing the metal powder for decomposition of organic halogen described in any one from the first invention to the fifth invention, wherein the method allows one phase among the above-described phases to come into contact with other phases so that the other phases are combined to the one phase.

According to this manufacturing method, it is not required to consider the easiness of dissolving the metal which is a major constituent of the other phase into acid or difference in the ionization tendency.

Therefore, the method defined in the seventh invention is a desirable method when considering a wide range of combination of metals as a base metal and an combining metal.

An eighth invention is to provide a method for remedying soil, and/or ground water, and/or surface water, wherein the method uses the metal powder for decomposition of organic halogen described in any invention from the first invention to the fifth invention.

BRIEF DESCRIPTION OF DRAWINGS

FIG. 4 is a table showing a decomposition half-life of organic chlorinated compound using comparison examples.

BEST MODE FOR CARRYING OUT OF THE INVENTION

Figure 1A:
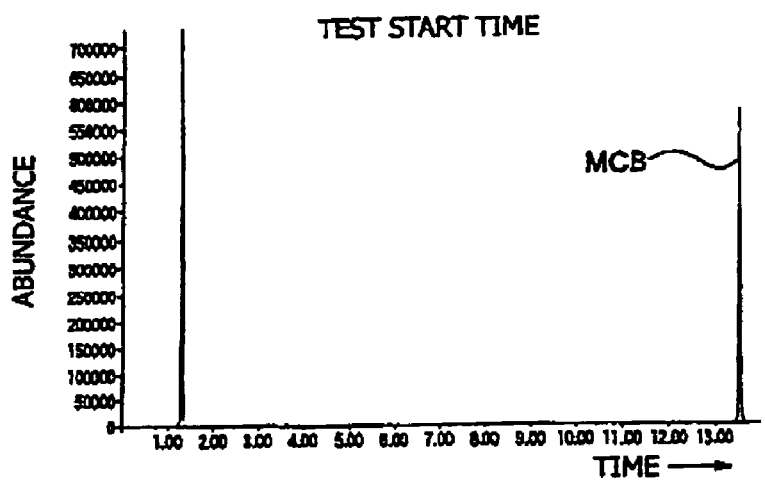
FIG. 1A, FIG. 1B, and FIG. 1C are graph charts showing a measurement result of a decomposition process of a contaminant using a GC-MS device.

The inventors first studied the decomposition rate constant of TCE using various iron powder samples and found that the iron powder sample disclosed in Japanese Patent Laid-open No. Hei 11-235577 had the largest value.

Then, specific surface areas of these various iron powder samples studied were measured and it was found that the iron powder sample had the largest value.

Further, a particle form of the iron powder sample was studied and it was found that the particle was not alloyed metal iron but a phase, the major constituent thereof being FeO (hereinafter referred to as FeO phase), was locally created in the inside and on the surface of the particle, and that the FeO phase and a phase whose major constituent is metal iron, that is base metal (hereinafter referred to as base metal iron phase), the major constituent being metal iron, were exposed together on the particle surface.

From the above, the present inventors presumed that the reasons of the large decomposition rate constant of TCE by the iron powder might come from the large specific surface area of the iron particle, and formation of local cells with the FeO phase and the base metal iron phase on the surface of the particle to create an electrolytic effect caused by an electric current of the local cell, and so on.

Next, the present inventors studied decomposition rates of TCE, cis-1,2-DCE, dichloromethane (hereinafter referred to as DCM), and MCB, using the iron powder, and copper-containing iron powder disclosed in Japanese Patent Laid-open No. 2000-5740 having copper content of 20 wt % as test samples.

As a result, in a decomposition test by the iron powder, the following result was obtained.

(TCE)>>(cis-1,2-DEC)>>(DCM)=(MCB), provided that DCM and MCB were scarcely decomposed.

Meanwhile in a decomposition test by the copper-containing iron powder, the following result was obtained.

(TCE)=(cis-1,2-DEC)=(DCM)>>(MCB), provided that MCB was scarcely decomposed.

Further, a comparison result of the decomposition rate constant between the iron powder and the copper-containing iron powder was the iron powder << the copper-containing iron powder over all organic chlorinated compounds.

From the above, it was assumed that, between a local cell formed with the FeO phase and the base metal iron phase on the particle surface in the iron powder, and a local cell formed with a phase the major constituent thereof being copper (hereinafter referred to as copper phase) and the base metal iron phase on the particle surface in the copper-containing iron powder, the larger the standard oxidation-reduction potential difference is, the larger the decomposition rate constant becomes and the range of decomposable compounds expands. Incidentally, the standard oxidation-reduction potential difference in a $Fe^{2+}/Fe$ cell reaction of the iron powder is 440 mV, and the standard oxidation-reduction potential difference in combination of a $Fe^{2+}/Fe$ cell reaction with a $Cu^{2+}/Cu$ cell reaction in a Fe—Cu interface of the copper-containing iron powder was 777 mV.

In addition to the above, it was found that there existed organic chlorinated compounds which can not be decomposed or make practically no progress in the decomposition process even when the copper-containing iron powder was used.

Here, the present inventors prepared various copper-containing iron powder samples having 0.1 wt % to 60 wt % of copper in the copper-containing iron powder, and measured decomposition rate constant of DCM.

As a result, the decomposition rate constant showed its maximum value at about 20 wt % of copper content.

When an combining state of the copper phase to the base metal iron phase was observed for particles of these various samples, it was found that the range to cover the base metal iron phase with the copper phase was increased as copper content increased, and that the base metal iron phase was almost completely covered with the copper phase at a copper content of about 60 wt %.

From the measurement result and the observation result described above, the present inventors have come up with the idea that in a phase whose major constituent was metal to be a base metal (hereinafter referred to as a base metal phase) and a metal phase whose major constituent was metal combining to this base metal phase (hereinafter referred to as an combining metal phase), by taking difference in standard oxidation-reduction electric potential between the major constituent metal element of the base metal phase and the major constituent metal element of the combining metal phase to be 778 mV or more, and by controlling a state to cover the base metal phase with the combining metal phase appropriately, it might become possible to manufacture metal powder for decomposition of organic halogen capable of decomposing even hardly decomposable organic halogen compounds.

In other words, the present inventors come up with the idea that iron powder prepared by selecting such a combination of two metals that can give difference in standard oxidation-reduction electric potential of 778 mV or more, more preferably 900 mV or more in absolute value, that is higher than 777 mV, the value being the difference in standard oxidation-reduction electric potential between iron and copper which were the major constituent of the base metal phase and the major constituent of the combining metal phase in the aforementioned copper-containing iron powder respectively, and by allowing the base metal phase in which one metal element is a major constituent to be combined by the combining metal phase in which the other metal element is a major constituent among the combinations of these metal elements could be metal powder for decomposition of organic halogen capable of decomposing and remedying even hardly decomposable organic halogen compounds.

Further, it is preferable to increase the decomposition and remediation rate of the above-described organic halogen compounds or to reduce the manufacturing cost of the metal powder by preparing metal powder in which two kinds or more of combining metal phases are combined to the base metal phase or at least one kind or more of combining metal phase(s) is/are combined to two kinds or more of base metal phases. In this case, it is sufficient if difference in standard oxidation-reduction electric potential in an absolute value between any two kinds of metal elements which are a major constituent of the base metal phase or the combining metal phase is 778 mV or more, preferably 900 mV or more.

Incidentally, a particle diameter of the metal powder for decomposition of organic halogen relating to the present invention is preferably in a range of 1 to 500 μm.

Because when the particle diameter is 1 μm or less, though dispersibility into soil is excellent, it may pass through interstices of soil particles and be washed away toward the lower layer together with, for instance, ground water stream. On the other hand, when the particle diameter is more than 500 μm, though the particles are positionally stable in the soil, since the usage of the metal powder for decomposition of organic halogen per unit soil area is increased, when considering cost performance, a particle diameter of 500 μm or less is preferable.

However, the particle diameter is not limited to the above range when adopted metal powder has such a large specific surface area as that of spongy particle. When metal powder having a large specific surface area is used, the number of effective reaction sites per unit weight of the powder is increased. Therefore, it becomes possible to reduce the usage per unit soil area, and metal powder having a particle diameter of more than 500 μm can be desirably used.

There is no limitation on the shape of the sample metal powder, but a preferable form is such that it has a large specific surface area per unit weight, and the combining metal phase thereof is scatteredly dispersed independently with no continuation on the base metal phase.

In other words, it is preferable that at least two phases forming the sample expose themselves on the surface of the sample metal powder. It can be considered that this is because the sample can decompose neighboring organic halogen compounds effectively owing to this formation.

From similar reasons, it is preferable that the potential difference between the metal elements which are major constituents for at least any two phases exposing on the surface of the sample metal powder is 778 mV or more, more preferably 900 mV or more.

Further, it is preferable that the base metal phase and the combining metal phase come in contact with each other in their metallic states so that a sufficient potential difference is generated in the interface therebetween. However, there is no harmful influence on the characteristics even when a portion of a compound form such as oxide of the base metal and the like exists partially in the interface between the base metal phase and the combining metal phase.

There is no limitation on the combining film thickness of the combining metal phase. However, when expensive metal is used as an combining metal, it is preferable to make the thickness as thin as possible from the view point of cost performance.

Here, a chemical method and a physical method are available for a method to combine the combining metal phase to the base metal phase.

The chemical method includes the steps of immersing the base metal powder into an acid solution or the like of the combining metal so that the combining metal phase is combined to the base metal phase utilizing a difference between the ionization tendencies of both metals. At this time, it is possible to control a state of combining the combining metal phase to the base metal phase, the thickness of the combined film and the like by controlling the concentration of the combining metal solution, immersion time, and so on. This method is desirable because metal powder for decomposition of organic halogen having a uniform characteristic can be easily prepared.

The physical method consists of the steps of mixing particles containing the base metal phase pulverized in advance and particles containing the combining metal phase with a mixer or the like so that the combining metal phase is combined to the base metal phase utilizing collision pressure created by the contact of the particles with each other at the time of mixing.

As a result of observing the metal powder prepared by this method with an electron microscope, it is found that an alloy layer of both metals does not exist in the interface of the base metal phase and the combining metal phase, and both metal phases are coupled to each other directly boundered by the interface. Further, the combining metal phase is thought to contact with pressure to the base metal phase because the combining metal phase is observed to be deformed as if pressure is applied thereon.

According to this method, it is not necessary to consider the difference in easiness of dissolution by acid or in ionization tendency. Therefore, this method is desirable when considering wide range of combinations of the metals as a base metal and an combining metal.

Here, when, for instance, the combining metal is a high cost metal or the like, it is also a desirable formation to form the metal powder for decomposition of organic halogen in such a manner that particles containing the base metal phase account for most of the metal powder for decomposition of organic halogen and the particles containing the combining metal scatteredly combine to the surface of the particles containing the base metal phase by enhancing the ratio of particles containing the base metal phase in a mixing ratio of particles containing the base metal phase to particles containing the combining metal phase.

Here, the present inventors prepared metal powder samples for decomposition of organic halogen such as copper-combining zinc powder, copper-combining manganese powder, cobalt-combining manganese powder, copper-combining magnesium powder, cobalt-combining magnesium powder, iron-combining magnesium powder, aluminum-combining iron powder, and so on as examples of combinations of a base metal phase and an combining metal phase to be combined to the base metal phase.

Each sample of copper-combining zinc powder, copper-combining manganese powder, cobalt-combining manganese powder, copper-combining magnesium powder, cobalt-combining magnesium powder, and iron-combining magnesium powder is prepared by the chemical method, and aluminum-combining iron powder sample is prepared by the physical method.

Incidentally, the standard oxidation-reduction potential difference of a local cell formed on the surface of each sample is 778 mV or more over all samples.

Further, samples in which Co or Al is a major constituent of the metal phase are desirable samples because they are stable as metal powder, and easy to handle and for storage.

The metal powder samples described above are applicable for decomposition of various hardly decomposable organic halogen compounds such as MCB as a start, 1,2-dichlorobenzene (hereinafter referred to as 1,2-DCB), 1,3-dichlorobenzene (hereinafter referred to as 1,3-DCB), DCM, carbon tetrachloride, 1,2-dichloroethane, 1,1-dichloroethane, 1,1,1-trichloroethane, 1,1,2-trichloroethane, 1,3-dichloropropene, trihalomethane, PCB, dioxin, and so on as well as PCE, TCE, cis-1,2-DCE, trans-1,2-DCE. Especially, it is suitable for decomposition of chlorinated organic compounds.

Further, the metal powder samples described above are capable to remedy soil, ground water, and surface water mixedly contaminated by heavy metal(s) and organic halogen compound(s).

When a hardly decomposable organic halogen compound described above comes in contact with the particle surface of a metal powder sample prepared by the above-described method, the contact is thought to be carried out in a form of gas adsorption if the hardly decomposable organic halogen compound is volatile, or in a form of contact accompanying when flowing or mixing if it is non-volatile.

Hardly decomposable organic halogen compounds which are gas-adsorbed to or allowed to contact with the particle surface of the metal powder sample are decomposed according to the interaction between constitution, surface conditions of the metal powder sample and constituent elements, three-dimensional structure of the organic halogen compound. This interaction means direct effect of the metal powder sample on halogen element in organic halogen compounds, effect on double bond portions, effect to form various complex structures, and the like. It is considered that according to the combination of the metal powder samples and the organic halogen compounds, combination of these effects differs which results in difference in its decomposition effect.

When remediation treatment for soil, ground water, gas, and so on contaminated by various organic halogen compounds is carried out using the above-described metal powder for decomposition of organic halogen compound is carried out, for instance, the following methods are desirable.

First, when remediation treatment of soil is carried out, there gives a method of mixing the metal powder for decomposition of organic halogen into dug soil using a heavy machine such as a soil conditioning machine or a backhoe. There gives another method of agitation mixing treatment by throwing dug soil, metal powder for decomposition of organic halogen, and grinding media into equipment such as a vibrating mill, a tumbling mill, or the like. Further, an applicable method is a method of disposing locally mixed metal powder portion for decomposition of organic halogen into contaminated soil appropriately and decomposition treatment is carried out while volatile organic halogen compounds are scattered and moved.

When remediation treatment of ground water is carried out, it is desirable to prepare a reaction wall containing metal powder for decomposition of organic halogen, through which ground water can permeate, in the ground. The reaction wall prepared in the ground is disposed so that ground water can come into contact with metal powder for decomposition of organic halogen. For this purpose, it is preferable to dispose or lay underground the lower end portion of the reaction wall into a hardly penetration layer positioned in the lower portion of an easy penetration layer in order to cover the easy penetration layer for ground water in a deep portion of the contaminated soil.

Further, it is preferable to adjust water permeability of the reaction wall in a favorable state so that the coefficient of water permeability of the reaction wall is in the same level or higher as compared with the adjacent soil. Therefore, it is preferable to prepare the reaction wall with, for instance, material in which metal powder for decomposition of organic halogen is dispersed uniformly or heterogeneously into high arenaceous soil or the like in the range from 0.1 wt % to 50 wt %.

The present invention will be explained further in detail based on test examples referring to drawings below.

EXAMPLE 1

(Preparation of Metal Powder Sample)

First, 300 ml of 1M copper sulfate aqueous solution was prepared to make slurry by throwing 20 wt % of zinc powder having average particle diameter of 50 µm therein, and stirred for 5 min.

The slurry after stirring was filtrated under reduced pressure and after the residue was washed with ethanol, it was dried at room temperature in a vacuum to obtain a copper-combining zinc powder sample.

Using the same method as in the above-described copper-combining zinc powder sample, a copper-combining manganese powder sample from a copper sulfate aqueous solution and manganese powder, a cobalt-combining manganese powder sample from cobalt sulfate aqueous solution and manganese powder, a copper-combining magnesium powder sample from copper sulfate aqueous solution and magnesium powder, a cobalt-combining magnesium powder sample from cobalt sulfate aqueous solution and magnesium powder, and iron-combining magnesium powder sample from iron sulfate aqueous solution and magnesium powder were prepared respectively.

(Observation of the Prepared Samples)

When observing the structure of thus obtained samples, the combining metal phase was observed to scatter with the thickness from submicron to about 3 µm at maximum on the base metal phase having an average particle diameter of 50 µm over all samples. Therefore, before and after combination of the combining metal phase, the particle diameter of the metal powder sample was scarcely changed.

It should be noted that the standard oxidation-reduction electrical potential differences of local cells formed on the surfaces of respective metal powder samples are 1,100 mV for the copper-combining zinc powder sample, 1,517 mV for the copper-combining manganese powder sample, 903 mV for the cobalt-combining manganese powder sample, 2,707 mV for the copper-combining magnesium powder sample, 2,107 mV for the cobalt-combining magnesium powder sample, and 1,930 mV for the iron-combining magnesium powder sample.

(Decomposition Test of Organic Halogen Compound with Prepared Sample)

Next, decomposition test of organic halogen compounds was carried out using cobalt-combining manganese powder sample among the prepared metal powder samples.

First, contaminant solutions for test were prepared by dissolving organic chlorinated compounds MCB, 1,2-DCB, and 1,3-DCB as hardly decomposable organic halogen compounds into ion-exchange water.

The concentration of the prepared contaminant solutions for the test were 22.13 mg/L for MCB, 26.13 mg/L for 1,2-DCB, 25.94 mg/L for 1,3-DCB.

A predetermined amount of toluene was added as an internal standard substance to solutions using 1,2-DCB and 1,3-DCB as organic chlorinated compounds.

Meanwhile, 0.5 g of cobalt-combining manganese powder sample was thrown in a 100 ml phial, 50 ml of the above-described contaminant solution for the test was poured and hermetically sealed with a silicon lining treated butyl rubber septum and an aluminum seal. The phial was stirred and shaken at the frequency of 300 times/min at 25° C. This treatment was continued.

At every predetermined intervals of time, 100 µm of gas in a head space portion of the phial was taken as a sample, and qualitatively and quantitatively analyzed with GC-MS (gas chromatograph-mass spectroscope equipment) equipment and measured the correlation between the concentration of the organic chlorinate compound in the gas in the head space portion and the period of time of the above-described stirring and shaking treatment.

The measurement result will be explained using FIG. 1A to FIG. 3C.

As described above, FIG. 1A to FIG. 3C are graph charts when the process of the cobalt-combining manganese powder sample which were prepared in the example 1 decomposing the contaminants for test prepared by dissolving the organic chlorinated compounds was measured using GC-MS equipment.

Figure 1B:
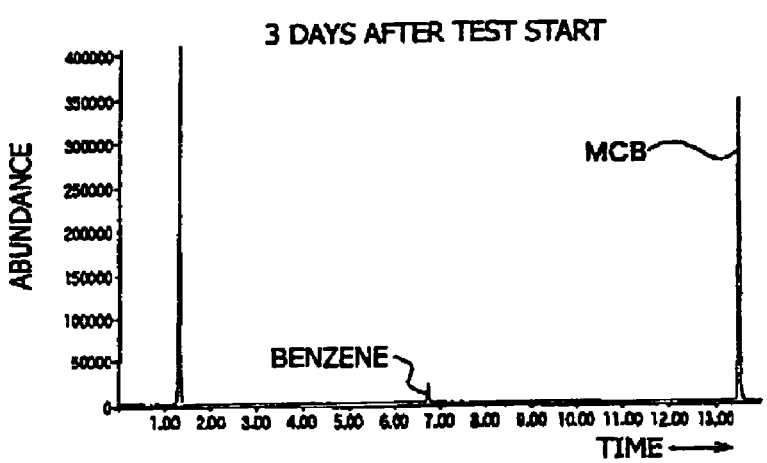
Figure 1C:
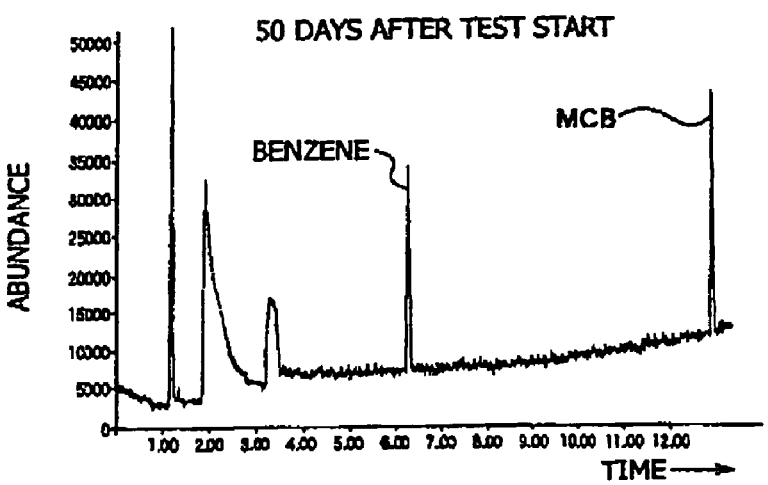
Figure 2A:
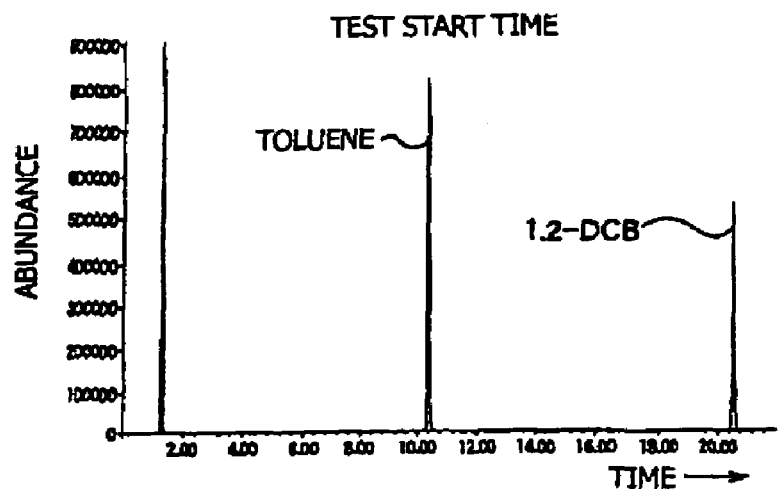
FIG. 2A, FIG. 2B, and FIG. 2C are graph charts showing a measurement result of a decomposition process of a contaminant using a GC-MS device.
Figure 2B:
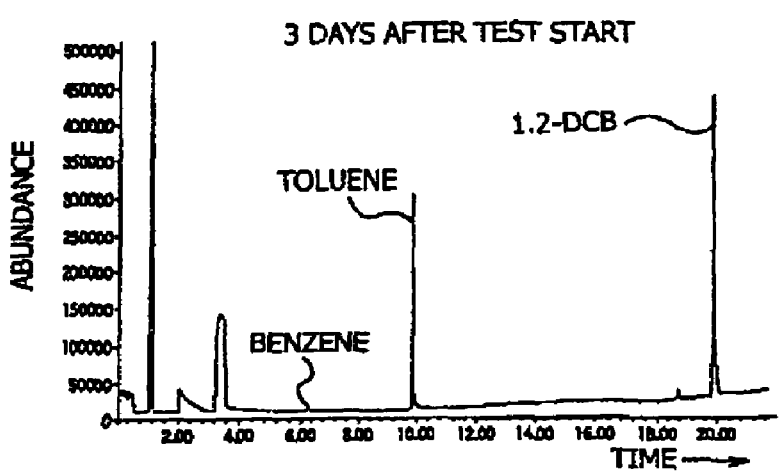
Figure 2C:
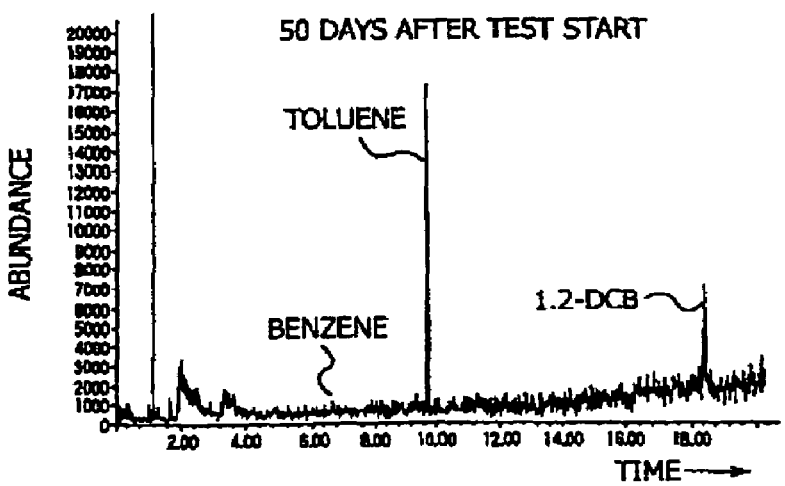
Figure 3A:
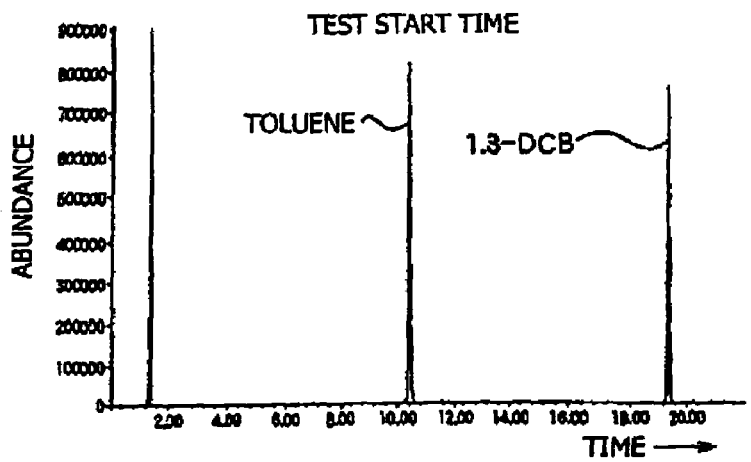
FIG. 3A, FIG. 3B, and FIG. 3C are graph charts showing a measurement result of a decomposition process of a contaminant using a GC-MS device.
Figure 3B:
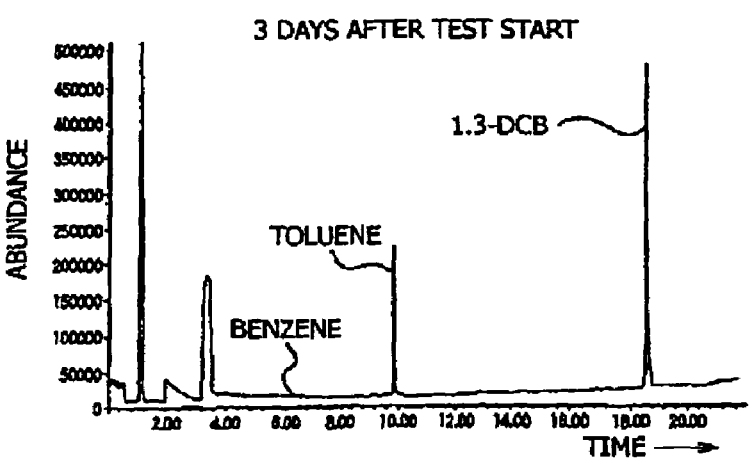
Figure 3C:
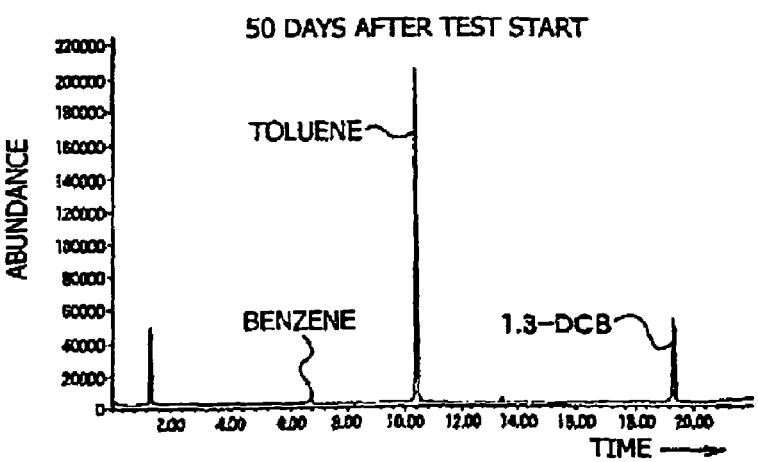

FIG. 1A, FIG. 1B and FIG. 1C show the case when MCB is used as a contaminant for the test, FIG. 2A, FIG. 2B and FIG. 2C show the case of using 1,2-DCB as above, and FIG. 3A, FIG. 3B and FIG. 3C show the case of using 1,3-DCB as above.

In FIG. 1A to FIG. 3C, FIG. 1A, FIG. 2A and FIG. 3A show the situations at the time of starting the stirring and shaking treatment, FIG. 1B, FIG. 2B and FIG. 3B show the situation at the time of 3 days continuation of the stirring and shaking treatment, and FIG. 1C, FIG. 2C and FIG. 3C show the situation at the time of 50 days continuation of the stirring and shaking treatment.

In each graph chart, the vertical axis shows detected intensity (abundance) of the organic chlorinated compound, and the horizontal axis shows time period for detection as a result of constituent separation by the gas chromatography.

In every organic chlorinated compound shown in FIG. 1A to FIG. 3C, the peak showing creation of benzene which is a product due to dechlorination effect by the metal powder sample was recognized.

In the meantime, when comparison of the peak intensity among 1,2-DCB, 1,3-DCB and the internal standard substance was carried out, it was observed that the detection peak of the organic chlorinated compound got enhanced during 3 days of the test period. This is considered to be due to difference in adsorption between the organic chlorinated compound and the internal standard substance to the metal powder sample. Then, decomposition of the organic chlorinated compound was made progress after 3 days and lowering of the detection peak of the organic chlorinated compound was recognized.

EXAMPLE 2

(Preparation of Metal Powder Sample)

An aluminum-combining iron powder sample in which iron as a major constituent of the base metal phase and aluminum as a major constituent of the combining metal phase were selected was prepared using a dry mill (mechanochemical) method which is a physical method.

First, iron powder of 50 µm in average diameter as metal particles to be the base metal and aluminum powder of 30 µm in average diameter as metal to be combined were prepared.

These were combined to be 80 wt % of the iron powder and 20 wt % of the aluminum powder and mixed. Then, 500 g of the mixture was put in a crushing pot of 2 liter in capacity. 5 kg of $ZrO_2$ balls having 20 mm in diameter as a crushing media was further put into the crushing pot and was set up on a tumbling mill. The number of revolutions of the mill was set to be 100 rpm and crushing treatment was carried out for 5 minutes to prepare the aluminum-combining iron powder sample.

(Observation of Prepared Sample)

When the sample prepared thus was observed with an electron microscope, it was found that the combining metal phase was scattered on the surface of the base metal phase in a form to be joined directly, and no alloy phase was recognized in the interface to be a border.

Incidentally, the standard oxidation-reduction electric potential difference of a local cell formed on the surface of each metal powder sample is 1,220 mV.

(Decomposition Test of Organic Halogen Compound by Prepared Sample)

Next, a decomposition test of the organic halogen compounds were carried out using the samples prepared as above.

As in Example 1, a contaminant solution for the test was prepared by dissolving cis-1,2-DEC as an organic halogen compound in ion exchange water at the concentration of 25.6 mg/L.

Meanwhile, as in the Example 1, 0.5 g of the sample was thrown in a 100 ml phial, 50 ml of the above-described contaminant solution for the test was thrown therein, and the phial was stirred and shaken after hermetically sealed. At every predetermined intervals of time, gas in the head space portion of the phial was taken as a sample, and qualitatively and quantitatively analyzed with GC-MS (gas chromatograph-mass spectroscope equipment) equipment and the half-life of decomposition of the test contaminant was measured from the concentration of the organic chlorinated compound in the head space portion gas and the above-described stirring and shaking treatment time.

From this measurement result, it was found that the half-life of the decomposition of cis-1,2-DCE by the aluminum-combining iron powder sample was 1.9 days.

COMPARISON EXAMPLE

An iron powder and a copper-containing iron powder were prepared as comparison samples.

In the iron powder sample, a FeO phase is created locally in the inside and on the surface of the iron powder, and the FeO phase and the base metal iron phase are structured to be exposed on the particle surface together. The standard oxidation-reduction electric potential difference of the local cell was 440 mV.

The copper-containing iron powder sample was prepared as the sample in Example 1 in a manner such that 300 ml of 1M copper sulfate aqueous solution was prepared to make slurry by throwing 20 wt % of iron powder having average particle diameter of 50 μm therein, and stirred for 5 minutes. The standard oxidation-reduction electric potential difference of the local cell formed on the surface of the copper-containing iron powder was 777 mV.

A decomposition test of the organic halogen compounds was carried out using this sample for the comparison example.

As in Example 1, ion exchange water solutions of respective organic chlorinated compounds at the concentration of 25.6 mg/L for cis-1,2-DCE, 22.2 mg/L for MCB, 26.12 mg/L for 1,2-DCB, 26.12 mg/L for 1,3-DCB, and 26.6 mg/L for DCM were prepared.

In the meantime, as in Example 1, 0.5 g of the sample was thrown in a 100 ml phial, 50 ml of the above-described contaminant solution for the test was thrown therein and the phial was stirred and shaken after hermetically sealed. At every predetermined intervals of time, gas in the head space portion of the phial was taken as a sample, and qualitatively and quantitatively analyzed with GC-MS (gas chromatograph-mass spectroscope equipment) equipment and the half-life of decomposition of the test contaminant was measured from the concentration of the organic chlorinated compound in the head space portion gas and the above-described stirring and shaking treatment time.

The test result will be explained using FIG. 4.

FIG. 4 is a table showing the measurement result of the half-life at the time when the above-described iron powder sample and the copper-containing iron powder sample decompose the organic chlorinated compounds which are the above-described test contaminants.

From the result in FIG. 4, it was found that the half-life at the time when the iron powder sample and the copper-containing iron powder sample decompose cis-1,2-DCE, MCB, 1,2-DCB, 1,3-DCB, DCM were 3 days or more, or the decomposition was found to make scarcely progress.

As explained above, the present invention have invented metal powder for decomposition of organic halogen in such a manner that in order to decompose and remedy a wide range of organic halogen compounds including organic halogen compounds which are difficult to be decomposed by a conventional method for decomposition and remediation, metal powder containing at least two kinds or more of metal elements, the respective metal elements forming phases, the respective metal elements therein serving as major constituents thereof, and the metal powder containing the phases, wherein difference in standard oxidation-reduction electric potential between any two kinds among the above-described metal elements is 778 mV or more in absolute value.

It has become possible to decompose and remedy organic halogen compounds including the above-described hardly decomposable organic halogen compounds by using the above-described metal powder for decomposition of organic halogen.

The invention claimed is:

1. A method for remedying soil and/or ground water and/or surface water contamination, comprising:
    using a metal powder for decomposition of organic halogen to remedy the contamination, the metal powder comprising at least two kinds or more of metal elements, the respective metal elements forming phases, said respective metal elements therein serving as major constituents thereof, and said metal powder containing said phases,
    wherein the metal powder for decomposition of organic halogen is any one of copper-combining zinc powder, copper-combining manganese powder, cobalt-combining manganese powder, iron-combining magnesium powder, and aluminum-combining iron powder, wherein difference in standard oxidation-reduction electric potential between any two kinds among said metal elements is 778 mV or more in absolute value.

2. The method for remedying soil and/or ground water and/or surface water contamination according to claim 1, wherein at least two kinds of phases among said phases expose themselves on the surface of said metal powder.

3. The method for remedying soil and/or ground water and/or surface water contamination according to claim 2, wherein said metal powder for decomposition of organic halogen has a structure such that other phases are combined to the surface of at least one phase among said phases.

* * * * *